Nov. 8, 1938.   R. M. MORRIS ET AL   2,135,672
ULTRA SHORT WAVE SYSTEM
Filed Sept. 30, 1936   3 Sheets-Sheet 1

INVENTORS
R. M. MORRIS AND
C. P. SWEENY
BY
ATTORNEY

Nov. 8, 1938.   R. M. MORRIS ET AL   2,135,672
ULTRA SHORT WAVE SYSTEM
Filed Sept. 30, 1936   3 Sheets—Sheet 2

INVENTORS
R. M. MORRIS AND
C. P. SWEENY
BY
ATTORNEY

Nov. 8, 1938. R. M. MORRIS ET AL 2,135,672
ULTRA SHORT WAVE SYSTEM
Filed Sept. 30, 1936 3 Sheets-Sheet 3

INVENTOR
R. M. MORRIS AND
C. P. SWEENY
BY
H. G. Grover
ATTORNEY

Patented Nov. 8, 1938

2,135,672

UNITED STATES PATENT OFFICE 2,135,672

ULTRA SHORT WAVE SYSTEM

Robert M. Morris, Millburn, and Carey P. Sweeny, Teaneck, N. J., assignors to Radio Corporation of America, a corporation of Delaware Application September 30, 1936, Serial No. 103,288

9 Claims. (Cl. 250—17)

The present invention relates to ultra short wave communication systems, and has for its main object to provide a small, highly compact, portable construction capable of being carried in the hand for transmitting and/or receiving waves of the order of one meter or less with good frequency stability.

Another object is to provide such an arrangement which can be modulated to a fairly high percentage of modulation without interfering with the frequency stability of the circuit.

Various features of the invention comprise the different condenser constructions which serve not only as by-pass capacitances, but also as supports for the circuit elements, and a novel condenser which forms a series capacitance in the shunt circuit without introducing physical irregularities.

A better understanding of the invention can be had by referring to the following description which is accompanied by drawings wherein:

Fig. 1 illustrates a novel mechanical circuit arrangement, in accordance with the principles of the invention, which can be used for transmitting purposes;

Figs. 1a and 1b are exploded cross sectional views of applicant's novel condenser constructions along the lines 1a—1a and 1b—1b, respectively;

Figure 1:
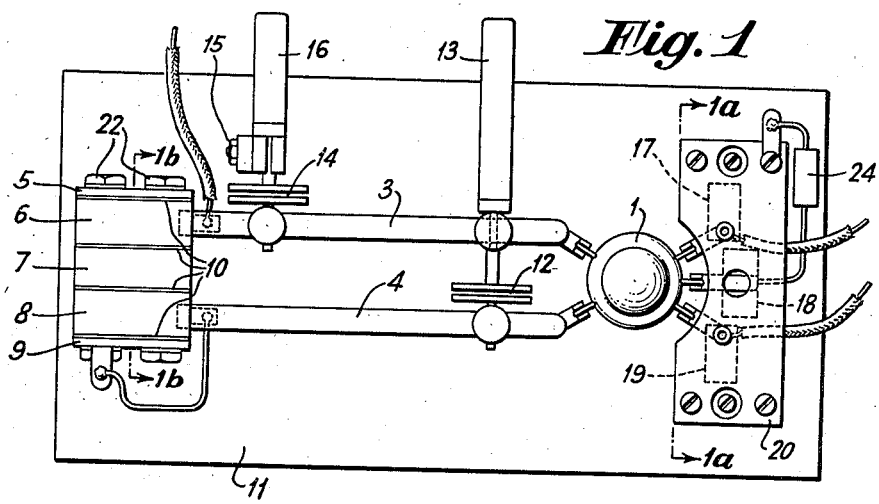

Referring to Fig. 1, there is shown a transmitting circuit comprising an electron discharge device oscillator 1, preferably of the Acorn type, having its anode and grid electrodes respectively connected with a pair of parallel tubular copper conductors 3, 4 forming part of a tuned circuit which includes, at its end remote from said electron discharge device, a condenser arrangement comprising five metallic bars, 5, 6, 7, 8 and 9, which are separated from one another by mica spacers 10. This condenser arrangement, it will be observed, consists of three intermediate bars of wider width than the two end bars, the bars 6 and 8 serving to support the conductors 3 and 4 which fit into suitably sized holes in these bars, the condenser in turn being mounted by means of its center bar 7 upon a metallic copper plate 11, with which it is in direct metallic and electrical contact. Since plate 11 is at zero radio frequency or ground potential with respect to the anode and grid of the vacuum tube 1, it will be evident that plates 6 and 8 serve to tie the low potential end of the line 3, 4 to ground as the frequency varies over the line.

At the end of line 3, 4, nearest the electron discharge device 1, there is provided a condenser 12 comprising two plates connected in shunt across the line, whose physical relationship can be varied to obtain any desired capacitance therebetween by means of insulator rod 13. Tapped along the rod 3 in the anode circuit is another condenser 14, one of whose plates is directly and electrically connected to a terminal 15 to which the antenna is connected. The capacitance of condenser 14 is also adjustable by means of an insulator rod 16.

The electron discharge device 1 is herein shown as an indirectly heated tube whose cathode and heater terminals are brought out at points along the envelope which are directly opposite the anode and grid terminals. These cathode and heater terminals are directly connected to a condenser arrangement comprising three separated flat plates 17, 18 and 19 lying in the same plane, the three plates in turn being separated by mica spacers from a pair of copper strips 20 and 21 which are clamped together as a unit and mounted on the assembly base 11. The vacuum tube is thus supported from the condenser arrangement 17 to 20 which, in turn, also functions as a by-pass condenser arrangement for enabling the radio frequency energy to pass directly from each of the cathode and heater terminals to ground.

Figures 1A, 1B:
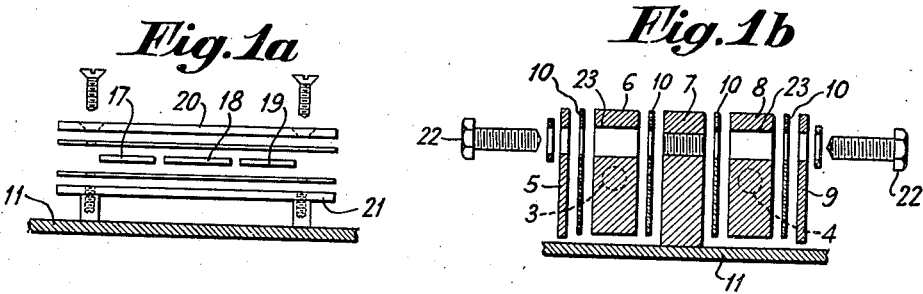

The detailed arrangement of this last by-pass condenser is shown more specifically in Fig. 1a, which shows an enlarged, exploded view of this arrangement, along the lines 1a—1a of Fig. 1. The upper and lower plates 20 and 21 are connected together by means of screws, as shown, the screws in turn being screwed into metallic stand-offs which directly and electrically connect the plates 20 and 21 to the mounting plate 11.

Fig. 1b similarly shows an enlarged, exploded, cross sectional view of the by-pass condenser arrangement comprising plates 5, 6, 7, 8, 9 and 10 along the lines of 1b—1b. It will be observed that the center plate 7 is directly mounted on and in electrical contact with the metallic plate 11, while the two outer copper plates 5 and 9, although longer than plates 6 and 8, do not directly contact the plate 11. However, plates 5 and 9 are directly connected to the center plate 7 by means of screws 22. The reason plates 5 and 9 are not designed to directly contact plate 11 at their lower ends is to prevent noise and electrical disturbances from being introduced into the system by any possible variation in contact between the plates 5, 9 and 11. Screws 22, it should be noted, are insulated from plates 6 and 8 by means of the bushing 23. Although it has been stated that the various plates are composed of copper, it should be understood that any of the metallic constructions hereinabove mentioned can be made of aluminum, or other pure metal of high conductivity, except for the rods 3 and 4, which should be of copper for optimum results.

Figure 2:
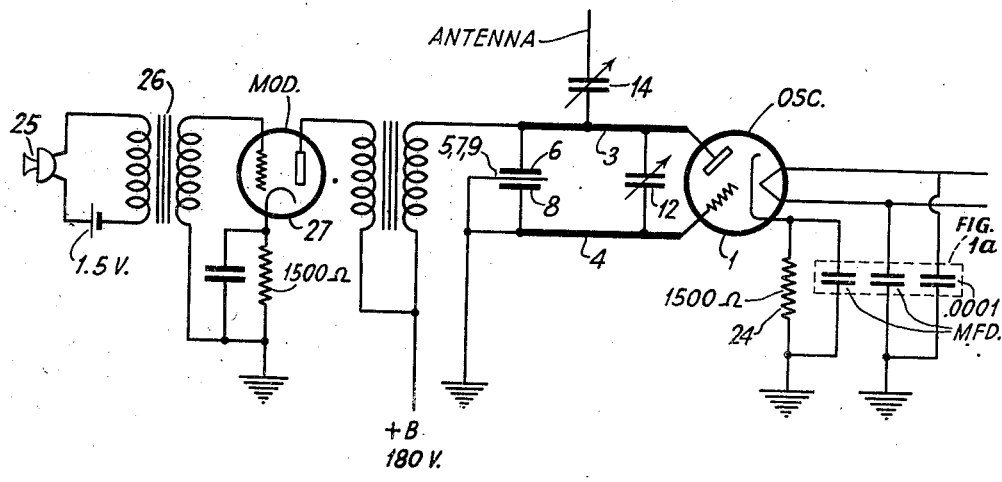
Fig. 2 shows the equivalent circuit arrangement of Fig. 1 in connection with a complete transmitting arrangement.

Fig. 2 shows the electrically equivalent circuit arrangement of Fig. 1 in connection with a complete transmitter system. In this figure the corresponding elements shown in Fig. 1 are labeled with the same reference characters. The assembly represented by Fig. 1a is shown in Fig. 2 as comprising three .0001 microfarad condensers within a dotted line box. Although the cathode biasing resistor 24 is herein indicated, it will be understood, of course, that in place thereof there may be used a grid leak connected between the grid lead 4 and ground at the end farthest away from the electron discharge device 1. The complete transmitting circuit includes a microphone 25 for impressing speech waves upon an audio frequency transformer 26 whose secondary winding is connected to the grid of a modulator tube 27, the output of the modulator tube in turn superimposing audio frequency energy upon the anode circuit of the oscillator 1. The operation of the transmitting circuit, it is thought, will now be apparent from what has been said before. The circuit of Fig. 2 has been found to be very satisfactory for transmitting waves of the order of one meter or less and the frequency stability found to be good with a fairly high percentage of modulation. With such an arrangement it was found possible to obtain at least 50% modulation without producing a frequency shift of more than one-tenth of one percent.

Figure 3:
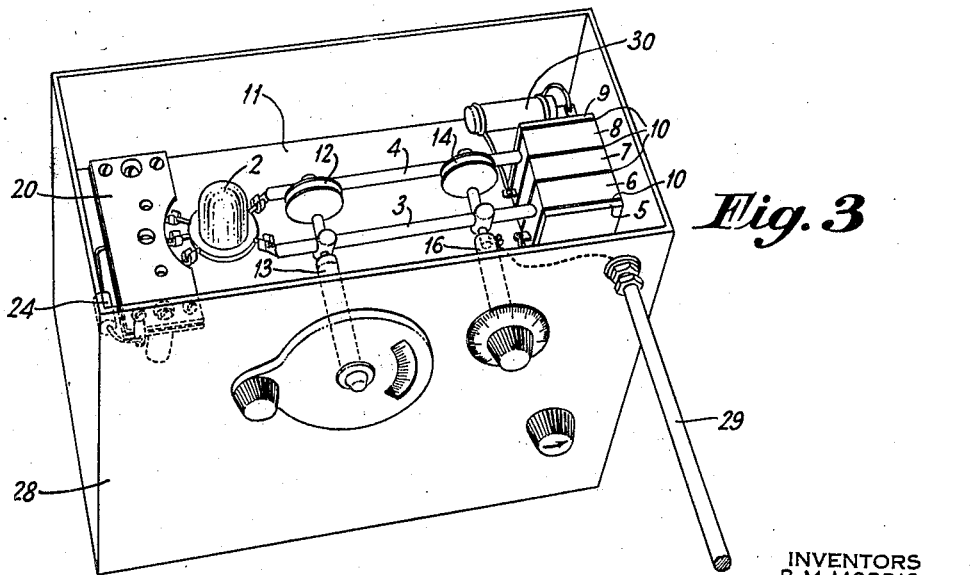
Fig. 3 shows a modification of the circuit of Fig. 1 adapted for receiving purposes.

Fig. 3 shows a slight modification of Fig. 1 adaptable for reception of ultra short waves, and illustrates the modification within a shielded metallic container 28. In this arrangement there is employed an Acorn type electron discharge device oscillator detector 2. The condenser arrangements 5 to 10 at one end of the Lecher wire system 3, 4, and the condenser arrangements 17 to 20 at the other end of the system are identical with the similarly labeled constructions of Fig. 1. In Fig. 3, however, the antenna (herein indicated as 29) is coupled to the grid lead 4 by means of a serially connected condenser 14 instead of to the anode wire 3, as shown in Fig. 1.

Figure 4:
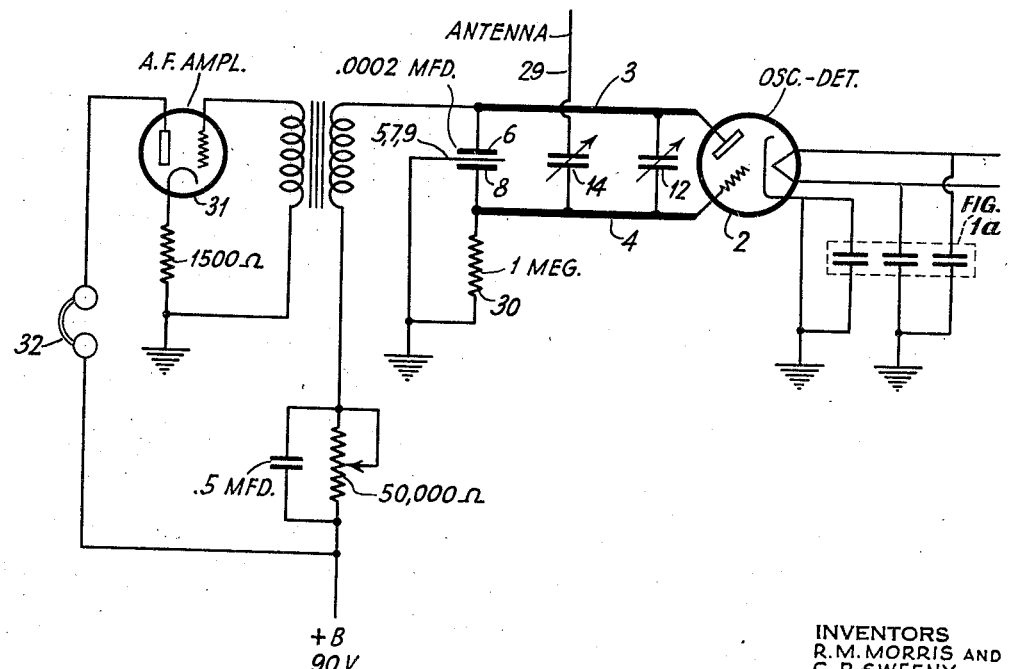
Fig. 4 shows the equivalent circuit arrangement of Fig. 3 in connection with the complete receiving system.

A better understanding of the operation of the circuit of Fig. 3 may be had by referring to the equivalent electrical circuit of Fig. 4 which shows the arrangement of Fig. 3 in connection with a complete receiving system. In Fig. 4 there is employed an oscillation detector circuit 2 in a super-regenerative receiver, the collected waves from antenna 29 being applied through condenser 14 to the grid rod 4. It will here be noted that there is employed a one megohm grid leak instead of the cathode bias resistor shown in Figs. 1 and 2. In the output circuit of the oscillator detector 2 and coupled to the anode rod 3 is an audio frequency amplifier 31 to whose anode circuit, in turn, is coupled any suitable utilization circuit such as a receiver 32.

From what has been said above, it should be distinctly understood that the anode and grid rods 3 and 4 form, with the condenser 12 and the by-pass condensers 5, 6, 7, 8 and 9, a tuned circuit which is tuned to the frequency either of the transmitted or of the received waves. The parallel rods 3 and 4 comprise, in effect, a frequency controlling line which serves to give improved frequency stability. Although the length of each of the leads 3 and 4 would ordinarily be about one-quarter of the length of the operating wave, this length, in the present instance, is materially reduced because of the loading provided by the condenser 12 and the interelectrode capacitance of the vacuum tube. In one practical embodiment successfully used, the actual length of each of the rods 3 and 4 was about three inches. An important feature of the circuit is the fact that the tuning condenser 12 serves both as a feedback condenser and to eliminate the customary slide wire tuning employed in conventional circuits.

Figure 5:
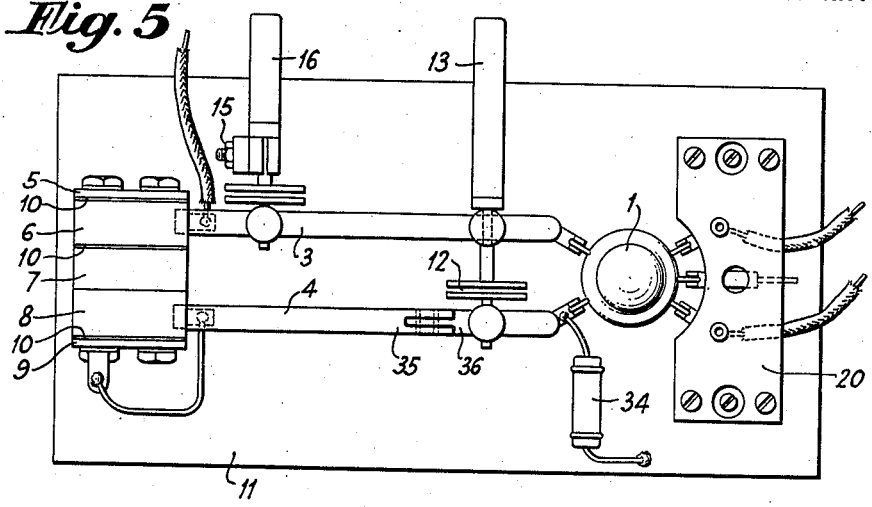
Fig. 5 illustrates an improved and preferred mechanical construction for the arrangements of Figs. 1 and 3.
Figure 5A:
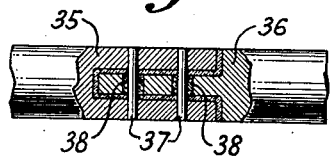
Fig. 5a is an enlarged view of a detailed improvement in the line construction of Fig. 5.

One disadvantage in using the systems of Figs. 2 and 4 lies in the fact that where a grid leak is employed there may occur undesirable audio frequency interruptions of the high frequency electron discharge device oscillator, due mainly to the time constants of the grid leak resistance and its shunted condenser. If a cathode bias resistor is used instead of a grid leak resistor, as shown in the transmitting circuit of Fig. 2, there is a sacrifice of some efficiency in the circuit. In order to overcome these difficulties and at the same time to prevent any electrical or physical discontinuity in the line circuit, it is proposed to provide a grid leak and grid condenser at that end of rod 4 nearest the grid electrode of the electron discharge device, and to directly connect the other end of rod 4 to ground, or a point of substantially zero radio frequency potential. Such an arrangement is disclosed in Fig. 5 which shows a preferred form of the invention, and except for the modifications hereinabove set forth is similar to the mechanical construction shown in Fig. 1. In Fig. 5 a grid leak resistor 34 is connected between the grid terminal of the rod 4 and the mounting plate 11, while the rod 4 is made to consist of two dove-tailed elements 35 and 36 to form a condenser. These elements 35 and 36, as will be noted from an inspection of Fig. 5a, which shows an enlarged detailed view thereof, are separated by mica and coupled together by means of two pins 37 which are insulated from element 36 by means of insulator bushings 38. Although elements 35 and 36 of the rod 4 have been shown dove-tailed, it will be quite obvious, of course, that the invention is not limited to such an arrangement inasmuch as any arrangement for coupling two elements of a line together to form a condenser without producing any physical or mechanical irregularity may be employed. For example, the outer surface of element 35 may be perfectly round and the end 36 may comprise a rod of reduced portion which can be inserted into an aperture in rod 35 and insulated therefrom by means of mica or any suitable dielectric. The other end of rod 4, which is mounted in plate 8, is connected to the ground or the element 11 by means of a direct conductive connection to plate 7 from between which plates 7 and 8 the mica insulation ordinarily used in the system of Figs. 1 and 3 has been omitted.

Figure 6:
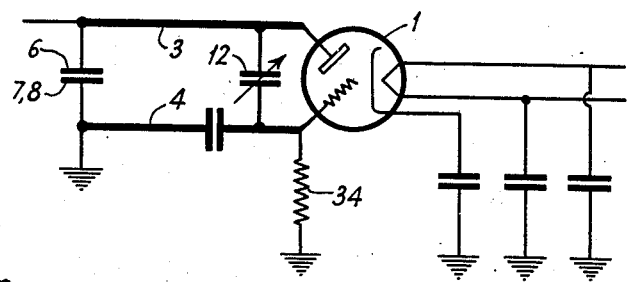
Fig. 6 illustrates the equivalent circuit arrangement of the system of Fig. 5.
Figure 7:
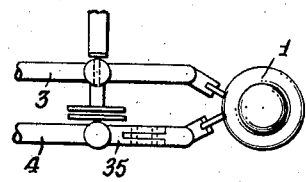
Fig. 7 illustrates a fragmentary view of a modification of a portion of the circuit of Fig. 5.

The equivalent electrical circuit of the system of Fig. 5 is shown in Fig. 6, which illustrates a transmitting arrangement. This circuit can be adapted for receiving purposes merely by changing the location of the condenser 12 from element 36 directly adjacent the grid electrode to element 35 on the other side of the condenser formed by the rod 4, in the manner shown in the fragmentary sketch of Fig. 7. In this way, when the circuit is used as a receiver, the additional feed-back normally produced by condenser 12 is reduced, due to having the condenser between elements 35 and 36 in series with the condenser 12, thus making it easier to properly quench the high frequency oscillations when the circuit is used as a super-regenerative receiver. It will be obvious, of course, that when used as a receiver, the antenna is preferably connected to the grid rod 4 instead of to the anode rod 3, as shown in Fig. 5, when the circuit is used as a transmitter. However, it is desirable to have the condenser (as indicated in Figs. 5 and 6) directly adjacent the anode and grid terminals because of the desirability of providing feed-back additional to that obtained from the interelectrode capacity of the vacuum tube.

The provision of the condenser 35, 36 in the manner shown in the drawings at the end of the grid rod 4 nearest the electron discharge device, is a decided improvement over the arrangements of Figs. 2 and 3, inasmuch as in this location the condenser 35, 36 is at a high voltage and low current point, whereas previously the grid lead condenser at the other end of rod 4 was located at a point of low voltage and high current. The location of the condenser 35, 36 at a high potential and low current point in the grid circuit allows the capacity to be reduced and gives a more favorable resistance-condenser value or time constant, thus eliminating difficulties due to audio frequency interruptions that are likely to be encountered with such values of capacity and resistance as are necessary to be used at the other end of the line 4. By means of the arrangement of Fig. 5, one can obtain a much greater frequency stability than that obtainable by the circuits of Figs. 2 and 4. In one specific embodiment employing the principles of Fig. 5, the frequency shift was only 0.028% as compared with 0.1% obtained with the circuit employing the arrangement of Fig. 2 for a frequency around 320 megacycles. It was also found that, with the circuit of Fig. 5, it was possible to use a higher percentage of modulation than was found possible in the circuits shown in Figs. 2 and 4. In one particular case using the system of Fig. 5 the carrier could be modulated 70% as compared with 50% in the previous circuit of Figs. 2 and 4 for the same frequency shift.

It should be distinctly understood that the invention is not limited to the precise arrangements hereinabove illustrated and described since various modifications thereof may be made within the spirit and scope of the invention. For example, it is not necessary that the antenna be capacitively coupled to either the rod 3 or 4 since inductive coupling can be used instead, merely by looping the lower end of the antenna to provide a portion parallel to the rods 3 and 4, in order to give the desired coupling. Where a dipole is coupled, the ends of the loop would then be connected to the two arms of the dipole, while if a single rod antenna is employed the end of the loop away from the antenna will be connected to ground. Similarly, if desired, the compactness of the arrangement of the invention could be further increased and the over-all length of the system reduced by superposing the two condenser systems 5, 6, 7, 8, 9, 10 and 11 and 17, 18, 19 and 20 on one another, and so constructing the rods 3 and 4 as to form a loop from one condenser construction back to the other, in which case the electron discharge device will be located near the combined condenser assemblies.

What is claimed is:

1. A high frequency system comprising an electron discharge device having anode, grid and cathode electrodes, an oscillatory circuit comprising two parallel rods, a condenser assembly comprising at least three adjacent fixed plates separated from one another by a suitable dielectric, means for maintaining the center plate of said condenser assembly at zero radio frequency potential, said two parallel rods being connected to and supported at one end from said other two plates of said condenser assembly, the other ends of said rods being directly connected to said anode and grid electrodes and supporting said device, another condenser assembly comprising a plurality of separated plates in the same plane, a metallic plate on each side of said plurality and separated therefrom by a suitable dielectric, means for maintaining said last metallic plates on both sides of said plurality at zero radio frequency potential, said cathode electrodes being connected to said plurality of plates which also aid in supporting said device.

2. A system in accordance with claim 1, characterized in this that said oscillatory circuit includes a condenser comprising two spaced plates connected substantially to the ends of said rods near said device, said last plates being supported by said rods.

3. A system in accordance with claim 1, characterized in this that said means for maintaining the center plate of said first condenser assembly and two of the plates of said second condenser assembly at zero radio frequency potential comprises a metallic mounting for said plates.

4. A system in accordance with claim 1, characterized in this that the terminals of said anode and grid electrodes extend from the envelope of said electron discharge device at points oppositely located with respect to the terminals of said cathode.

5. A high frequency system comprising an electron discharge device having anode, grid and cathode electrodes, an oscillatory circuit comprising two parallel rods, a condenser assembly comprising two adjacent fixed plates separated from one another by a suitable dielectric, means for maintaining one of said fixed plates at zero radio frequency potential, said two parallel rods being connected to and supported at one end from said two plates, the other ends of said rods being directly connected to said anode and grid electrodes and supporting said device, said rod which is connected to said grid being connected to said one fixed plate of said condenser assembly, another condenser assembly comprising a plurality of separated plates in the same plane, a metallic plate on each side of said plurality and separated therefrom by a suitable dielectric, means for maintaining said last metallic plates on both sides of said plurality at zero radio frequency potential, said cathode electrode being connected to said plurality of plates which also aid in supporting said device, a grid leak consisting of a resistance connecting the grid end of that parallel rod which is coupled to said grid to a point of zero radio frequency potential, and a condenser in said rod connected to said grid at a point near said grid, said condenser forming part of said last rod and comprising two portions separated by a dielectric and so arranged and constructed as to provide a smooth, continuous rod having no mechanical or physical irregularities therein.

6. A system in accordance with claim 1, characterized in this that said device comprises an indirectly heated arrangement having two heater terminals and a cathode terminal, all of which terminals are individually coupled to one of said coplanar plates of said last condenser assembly.

7. A transmitting high frequency system comprising an electron discharge device having anode, grid and cathode electrodes, an oscillatory circuit comprising two parallel rods, a condenser assembly comprising two adjacent fixed plates separated from one another by a suitable dielectric, means for maintaining one of said fixed plates at zero radio frequency potential, said two parallel rods being connected to and supported at one end from said two plates, the other ends of said rods being directly connected to said anode and grid electrodes and supporting said device, said rod which is connected to said grid being connected to said one fixed plate of said condenser assembly, another condenser assembly compriing a plurality of separated plates in the same plane, a metallic plate on each side of said plurality and separated therefrom by a suitable dielectric, means for maintaining said last metallic plates on both sides of said plurality at zero radio frequency potential, said cathode electrode being connected to said plurality of plates which also aid in supporting said device, a grid leak consisting of a resistance connecting the grid end of that parallel rod which is coupled to said grid to a point of zero radio frequency potential, and a condenser in said rod connected to said grid at a point near said grid, said condenser forming part of said last rod and comprising two portions separated by a dielectric and so arranged and constructed as to provide a smooth, continuous rod having no mechanical or physical irregularities therein, a condenser bridged across and supported by said rods at the end thereof directly connected to said grid and anode electrodes, one terminal of said last condenser being located between said grid and said grid leak condenser.

8. A receiving high frequency system comprising an electron discharge device having anode, grid and cathode electrodes, an oscillatory circuit comprising two parallel rods, a condenser assembly comprising two adjacent fixed plates separated from one another by a suitable dielectric, means for maintaining one of said fixed plates at zero radio frequency potential, said two parallel rods being connected to and supported at one end from said two plates, the other ends of said rods being directly connected to said anode and grid electrodes and supporting said device, said rod which is connected to said grid being connected to said one fixed plate of said condenser assembly, another condenser assembly comprising a plurality of separated plates in the same plane, a metallic plate on each side of said plurality and separated therefrom by a suitable dielectric, means for maintaining said last metallic plates on both sides of said plurality at zero radio frequency potential, said cathode electrode being connected to said plurality of plates which also aid in supporting said device, a grid leak consisting of a resistance connecting the grid end of that parallel rod which is coupled to said grid to a point of zero radio frequency potential, and a condenser in said rod connected to said grid at a point near said grid, said condenser forming part of said last rod and comprising two portions separated by a dielectric and so arranged and constructed as to provide a smooth, continuous rod having no mechanical or physical irregularities therein, a condenser bridged across and supported by said rods at the end thereof directly connected to said grid and anode electrodes, one terminal of said last condenser being located between said grid leak condenser and the opposite end of said grid rod.

9. A high frequency system comprising an electron discharge device having anode, grid and cathode electrodes, an oscillatory circuit comprising two parallel rods, a condenser assembly comprising a plurality of insulated plates, means for maintaining said plates at substantially zero radio frequency potential, said two parallel rods being connected to and supported at one end from two of said plates of said condenser assembly, the other end of said rods being directly connected to said anode and grid electrodes and supporting said device, another condenser assembly comprising a plurality of separated plates in the same plane, a metallic plate on each side of said plurality and separated therefrom by a suitable dielectric, means for maintaining said last metallic plates on both sides of said plurality at zero radio frequency potential, said cathode electrodes being connected to said plurality of plates which also aid in supporting said device.

ROBERT M. MORRIS.
CAREY P. SWEENY.